(12) United States Patent
King

(10) Patent No.: US 8,371,650 B2
(45) Date of Patent: Feb. 12, 2013

(54) LINER FOR A CHILD CAR SEAT OR OTHER SEAT

(76) Inventor: Susan King, Boise, ID (US)

( * ) Notice: Subject to any disclaimer, the term of this patent is extended or adjusted under 35 U.S.C. 154(b) by 843 days.

(21) Appl. No.: 10/704,860

(22) Filed: Nov. 7, 2003

(65) Prior Publication Data

US 2004/0207239 A1   Oct. 21, 2004

Related U.S. Application Data

(60) Provisional application No. 60/441,017, filed on Jan. 17, 2003.

(51) Int. Cl.
    *A47C 31/00*    (2006.01)
(52) U.S. Cl. .................................. 297/219.12
(58) Field of Classification Search ........... 297/128.872, 297/128.873, 184.11, 184.13, 219.12, 223, 297/224, 225, 228, 229, 250.1, 254, 219.1, 297/228.11; 224/256.15, 256.17, 411
    See application file for complete search history.

(56) References Cited

U.S. PATENT DOCUMENTS

| 4,188,065 | A | * | 2/1980 | Meeker | 297/485 |
| 4,478,453 | A | * | 10/1984 | Schutz | 297/219.12 |
| 4,885,200 | A | * | 12/1989 | Perdelwitz et al. | |
| 5,785,383 | A | * | 7/1998 | Otero | 297/255 |
| 5,954,404 | A | * | 9/1999 | Suzuki | 297/467 |
| 6,394,543 | B1 | * | 5/2002 | Dunne et al. | 297/219.12 |
| 6,428,098 | B1 | * | 8/2002 | Allbaugh | 297/219.12 |

* cited by examiner

*Primary Examiner* — Melanie Hand

(57) ABSTRACT

A disposable car seat, vehicle seat or other seat liner that may include: Version A, being sheet material having a top surface of an absorbent material and a bottom surface of non-permeable material; having several line points at the upper middle, lower middle, left and right sides of middle, and left and right sides of upper, outer edges to accept car seat belt hook-ups; an elasticized outer edge; a backing of light adhesive. Version B of invention includes: sheet material of the same qualities as version A; light adhesive backing; line point to accommodate hook-up belt of a protective arm; closure tabs on upper and lower edges. Version C designed for a booster seat, vehicle seat or other seat includes same material, line points and adhesive backing as version A; elasticized edge on central left and right sides that stand up forming a well or barrier.

11 Claims, 11 Drawing Sheets

LINER FOR A CHILD CAR SEAT OR OTHER SEAT

This application claims priority of our prior, provisional patent application, Ser. 60/441,017, filed on Jan. 17, 2003, entitled "Disposable or washable car seat liner", which is incorporated herein by reference.

BACKGROUND OF THE INVENTION

1. Technical Field

The present invention relates to a disposable or re-usable, washable, adjustable, removable liner for a child car seat, existing built-in car seat in a vehicle, child backless booster car seat and protective arm, and other seats.

2. Background Information

Child car seats, being mandatory, are in constant use. A child may be confined for long periods of time in the car seat.

Provisions must be made for food, drink, and entertainment for the child while confined in the car seat. Any of these provisions can cause a messy situation with crumbs and spills. Other problems arise, such as a leaking diaper or a child spitting up.

When any of these events occur the car seat must either be cleaned out with a vacuum or wiped off with a damp cloth or, most preferably, removed from the vehicle, washed, and allowed to dry before the child can be placed back in the car seat in a clean, comfortable environment. All of these options can cause a considerable delay in travel plans. Another consideration is the effect of the spills and accidents on the vehicle upholstery.

A towel or blanket cannot be used efficiently to protect the child or car seat because they interfere with the car seat's harness belt hook ups. Some car seats have a removable cover that can be laundered, but it is the original cover, and one must still wait for it to be washed and then dried before it can be re-installed and the child returned to the seat for travel. This type of washable cover is generally not easily removed or re-installed due to several screws or snaps that can be difficult to deal with. The cover is generally not of a thickness of padding that is comfortable for the child for a very long period of time. It is made that way intentionally to allow for faster drying after laundering.

This present invention, with three versions, solves each of these problems. The liner foremost keeps the child in a comfortable, sanitary environment all the time he is in the car seat. The liner is easily removed, folding inward as it is removed, trapping particles and moisture inside the liner. The liner is then replaced with a fresh disposable type, or a spare washable type liner. Travel can resume in a very short period of time. Many times the vehicle upholstery has been spared a major clean up or damage by using the liner.

The positioning of several line points for harness belt hook ups makes it very practical for many different car seat designs to be accommodated by the liner. The outer elasticized edge and security straps in combination with the harness belts rupturing through the liner at line points, or cuts being made on the lining for the belts to pass through, and a light adhesive backing, hold liner in place until it is intentionally removed. (Version A)

The protective arm liner gives much added protection to the child and to the protective arm original cover with it's extra absorbency. It is securely held in position by a light adhesive on the backside surface and "disposable diaper-like" closure tabs, until it is replaced with a fresh disposable or a spare reusable liner. A line point is positioned to cooperate with the harness belt hook up. (Version B)

The liner for the existing built-in car seat in a vehicle and backless booster car seat gives protection to the child and to the vehicle seat, where there is otherwise nothing to protect this surface. This liner is also held in place by line points for the harness belt hook ups, and by a light adhesive coating on the back side of liner. This version of the invention has an elasticized edge on both central sides that stands up above the car seat, retaining moisture inside the liner, protecting the vehicle upholstery. It is also removed easily and replaced with a fresh disposable liner or a spare washable type. (Version C)

This liner is installed in the backless booster car seat by draping the bottom portion of the liner over the car seat's seat area, then making contact with the vehicle upholstery by smoothing the top portion of the liner against the upholstery with decisive pressure. If using the type with adhesive tabs on the back, the corresponding tabs have been pre-applied to the vehicle upholstery. (Version C)

Versions of these liners could be used in other seats in addition to car seats and vehicle seats.

Materials used for this invention would be "disposable diaper-like" material or "panty-liner-like" material consisting of a first absorbent layer, a second optional, absorbable filler, and a bottom nonpermeable layer for the disposable versions; and a soft, washable fabric for the washable, reusable version of the liners.

BRIEF SUMMARY OF THE INVENTION

The present invention is a disposable or washable, reusable child car seat or other seat liner. The liner may be a sheet-like material with a first absorbent layer, a second nonpermeable layer, and a plurality of line points of reduced thickness and reduced strength in said sheet-like material to rupture or be cut easily and receive the seat belts or straps of the car seat or other seat. It may include:

Version A, a liner that lines the main body of a car seat that is:
  a) generally a rectangular shape;
  b) made of a sheet material, the top surface being of an absorbable material, the inner filler being absorbent, and the bottom layer being non-permeable, much like disposable diaper-like material or panty liner-like material
  c) having several points of reduced strength and reduced thickness lined with heat and pressure to accept and cooperate with car seat harness belts;
  d) having an optional elasticized outer edge that conforms to car seat contour;
  e) having an optional security strap with closure tabs, like those found on disposable diapers, to afford adjustibility of the liner;
  f) having an optional light adhesive coating on back side;

Version B, a liner that lines the protective arm of a child car seat that is:
  a) generally a rectangular shape;
  b) made of the sheet material with three layers as is Version A;
  c) having optional closure strips along upper and lower edges, like a disposable diaper;
  d) having line point to accommodate car seat belt hook up
  e) having an optional light adhesive coating on back side Version C, a liner to line a backless booster car seat with a protective arm or an existing built-in vehicle car seat that includes:
  a) generally of the same shape and size and material qualities as Version A;
  b) the same line points as version A;

c) With an optional elasticized edge on side central regions, drawn semi-taught to stand up above the car seat edge to form a well or barrier which traps particles and moisture;
d) having optional adhesive tabs on backside that adhere to upholstery in vehicle;
e) having an optional light adhesive coating on the back side

DETAILED DESCRIPTION OF THE INVENTION

Figure 1:
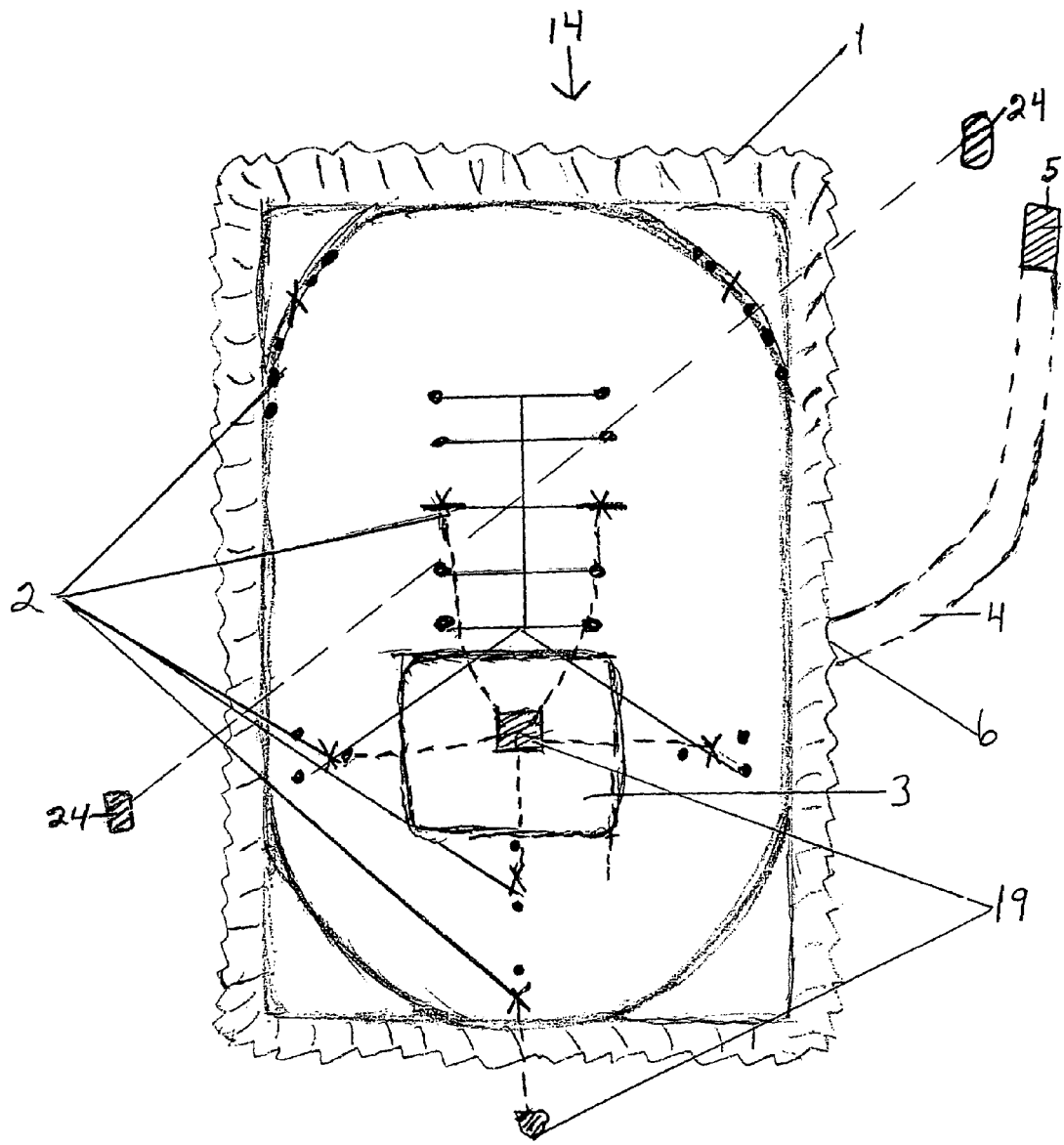
FIG. 1 is a front elevational view of version A of the car seat liner according to the present invention

Referring to FIG. 1, a disposable or washable child car seat liner being Version A, the main body liner 14 of the present invention. This version is made of a sheet like material having a first surface of absorbable material 25, an optional inner absorbable filler 26, and a bottom non-permeable surface 27. Liner can also be made of a washable, re-usable fabric. This version is adaptable to many different styles of car seats that are on the market today due to the line points 2 at various locations on the liner. Several rows of line points parallel to each other are located up the back portion of the liner, down the center-back, and angled off to adjoin line points in right and left seat areas. Line points are located in the seat portion on the right and left sides; in the front between child's legs; on the lower front, and on the upper, outer edge of top portion 24.

All these line points allow for the harness belt hook-ups to easily rupture or push through or be cut through at the particular points that best fit the individual car seat. The line points are of reduced strength and reduced thickness to further the ease of being cut or pushing through with belts. All of the line points can be more or less in number, and locations can be varied as styles in car seats change. This design does not limit the line point attributes of the invention.

Due to rupturing or cutting only the line points 2 necessary for harness belt hook-up and leaving the other line points intact, the possibility of fluids and particles penetrating the liner are minimized.

Absorbency in the seat area 3 is due to the thickness of the optional inner layer of absorbable filler 26 that is woven into the material, much like a disposable diaper or panty liner. Use of this technology that is currently on the market makes production of the liner easier and more desirable.

Figure 2:
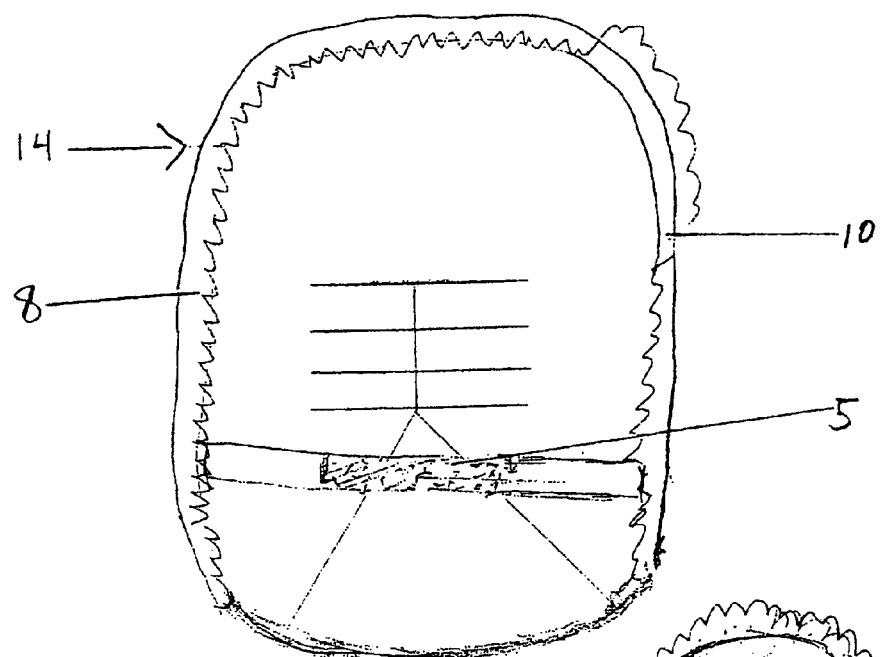
FIG. 2 is a rear elevational view of version A of the car seat liner according to FIG. 1 of the present invention, showing liner in place over the outer edge of the car seat, with security straps in place

The outer edge of Version A 14 has an optional elasticized edge 1 that is comparable to the elasticized edge found on a disposable diaper. The liner conforms to the contour of the car seat 10, as referring to FIG. 2, by liner overlapping 8 the outer edge of car seat, and contracting upon release after positioning. As referring to FIG. 5, the elasticized edge is flexible and forgiving, and will mold around protective arm 18 and other arms that may extend outward from outside edge of car seat.

Figure 3:
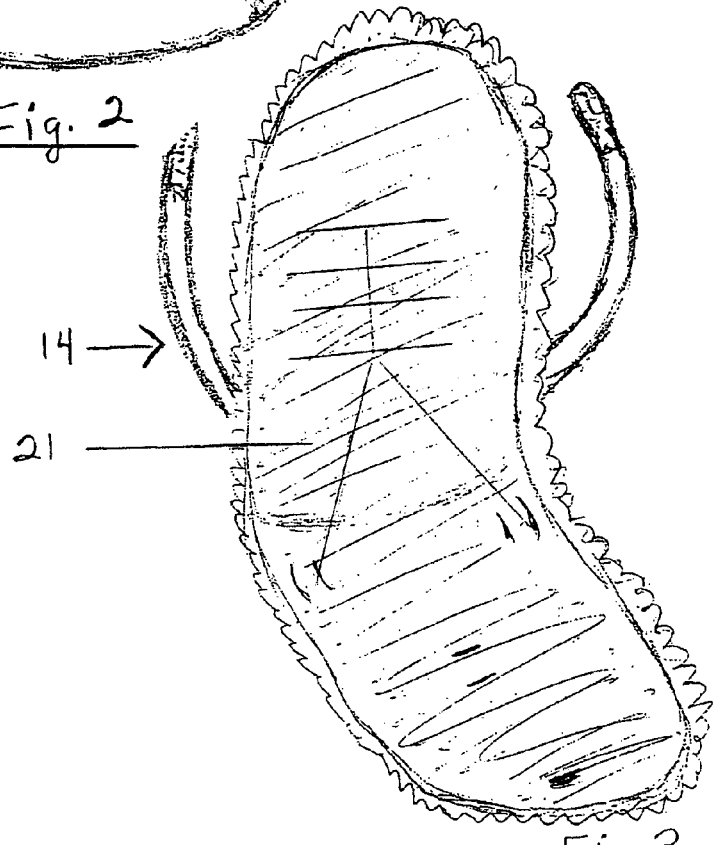
FIG. 3 is a rear elevational view of version A of the car seat liner according to FIG. 1 of the present invention, showing adhesive backing

Referring to FIG. 1, an optional security strap 4 is attached to the outer edge 6 at various points between top and bottom. The straps can be of the same or different material as the liner, having closure tabs 5 positioned on the ends. Closure tabs are like those found on disposable diapers with opposite sides adhering to each other. The tabs can be elongated to provide adjustability as they are pulled around back side of seat and closed with closure tabs, referring to FIG. 2. There could also be a hook or other device to secure the straps or strap Referring to FIG. 3, the back side of Version A 14 is shown with a light adhesive 21 coating which would easily pull away from car seat upon removal. The adhesive backing would be beneficial if large cuts through the line points were necessary. The liner would be decisively pressed with a hand motion against the car seat, causing the liner to adhere to the car seat and minimize the exposure from the cut. Version A 14 is also recognized by this invention without the adhesive backing, being securely held in place by the harness belts pushing through line points, the elasticized outer edge, and by the harness belts pushing through line points, the elasticized outer edge, and security straps.

Figure 4:
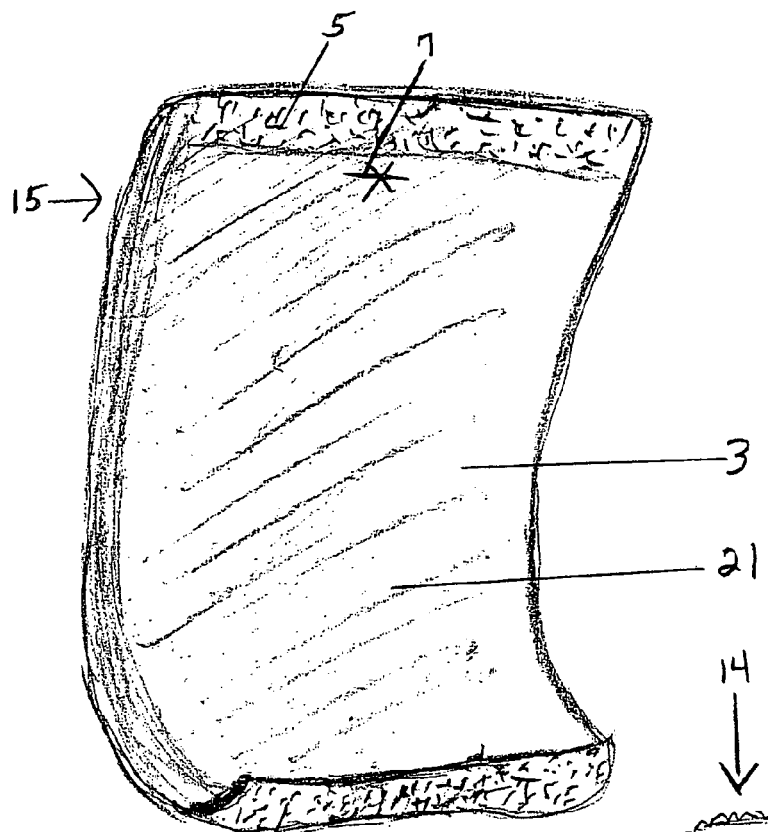
FIG. 4 is an open positional view of version B, the protective arm liner, of the present invention

Referring to FIG. 4, Version B 15 is shown in an open position. This version of the invention is a liner for a car seat 22 with a protective arm 18, or a backless booster seat 20 with a protective arm 18. It is also made of the disposable diaper-like material or panty liner-like material with extra absorbent filler 26 for added protection against moisture. This part can also be made of a washable fabric. Optional closure tabs 5 are the same as found on the security straps 4, referring to FIG. 1, and may extend from the middle of the upper and lower edge or edges to one or both outside edges.

Figure 5:
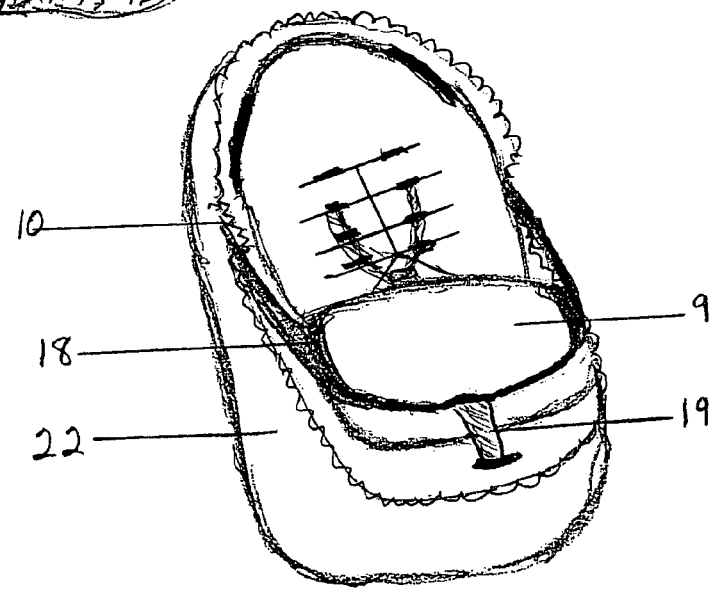
FIG. 5 is a front elevational view of versions A and B, according to FIGS. 1 and 4 of the present invention, installed in a car seat with a protective arm

A line point 7 is provided for the belt hook up 19 that extends downward from the center front bottom portion of the protective arm 18, as referred to in FIG. 5. Arm liner will close in the front portion of arm, out of child's view 9.

Figure 6:
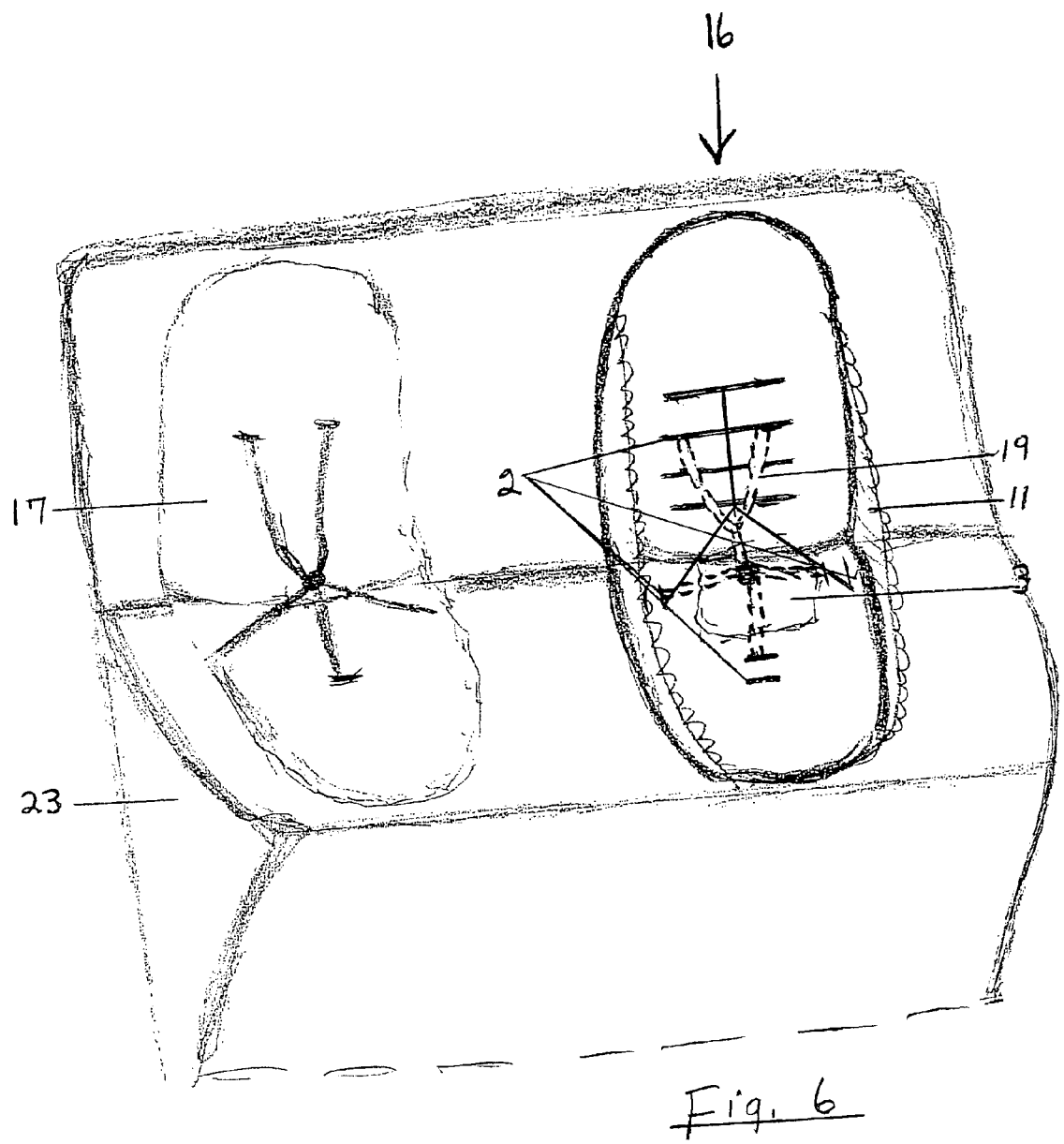
FIG. 6 is a front elevational view of version C of the present invention installed in a built-in existing car seat in a vehicle

Referring to FIG. 6, Version C 16 of the invention is a liner designed for existing vehicle car seats 17 and backless booster car seats 20 with a protective arm. This version of the invention has line points 2 for harness belt hook-ups 19; the disposable diaper-like material or panty liner-like material with absorbent first surface 25, optional inner layer of absorbent filler 26, and bottom surface of non-permeable material 27. Liner can also be made of a washable, re-usable fabric. This version has an optional, elasticized edge 11 on the right side and left side central regions that are pulled semi-taught and stand up above the edge of the car seat. This forms a well or barrier to trap particles and moisture within the liner until it is removed and replaced with a fresh disposable liner or a spare washable type, thus preventing damage to vehicle upholstery and car seat cover.

Figure 7:
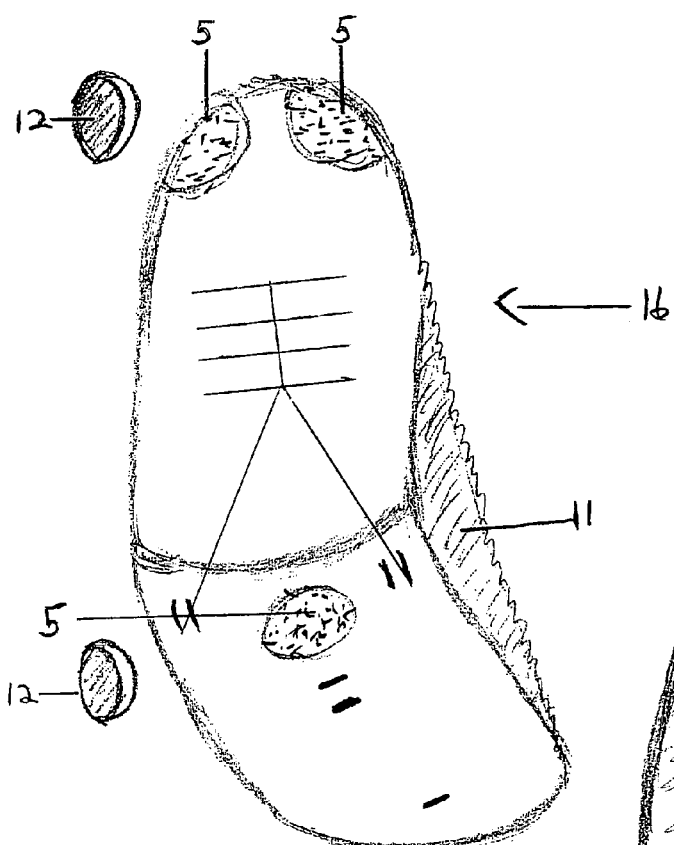
FIG. 7 is a rear elevational view of version C according to FIG. 6 of the present invention, showing "disposable diaper-like" closure tabs on liner and two-sided corresponding tabs with adhesive backing

Referring to FIG. 7, showing Version C 16 from a backside view, with disposable diaper-like tabs 5 at various spots woven on to the material the same as a disposable diaper. The correlating closure tabs 12 have a front side also with the surface that adheres to the surface on the back side of the liner. The back side of the tab 12 has a surface of a more aggressive adhesive that adheres to the vehicle upholstery until intentionally removed.

Figure 8:
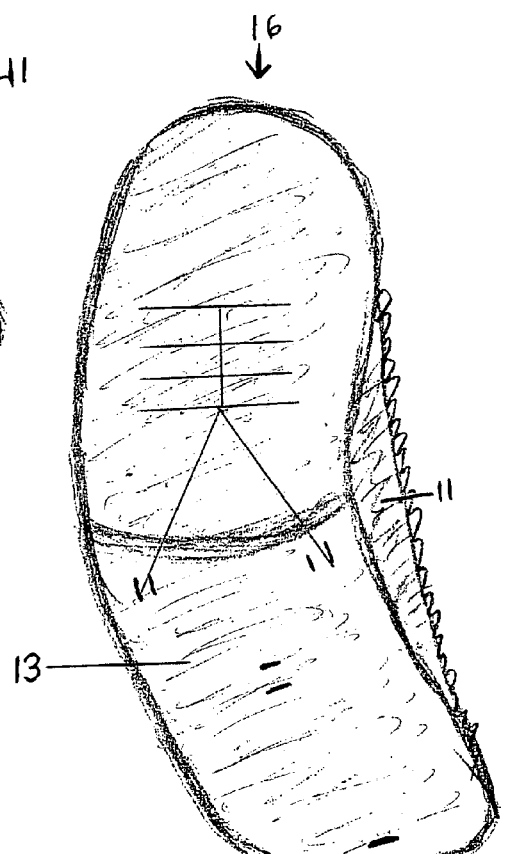
FIG. 8 is a second rear elevational view of version C according to FIG. 6 of the present invention showing a light adhesive backing

Referring to FIG. 8. the backside of Version C 16 is shown with a light adhesive backing 13 option.

Figure 9:
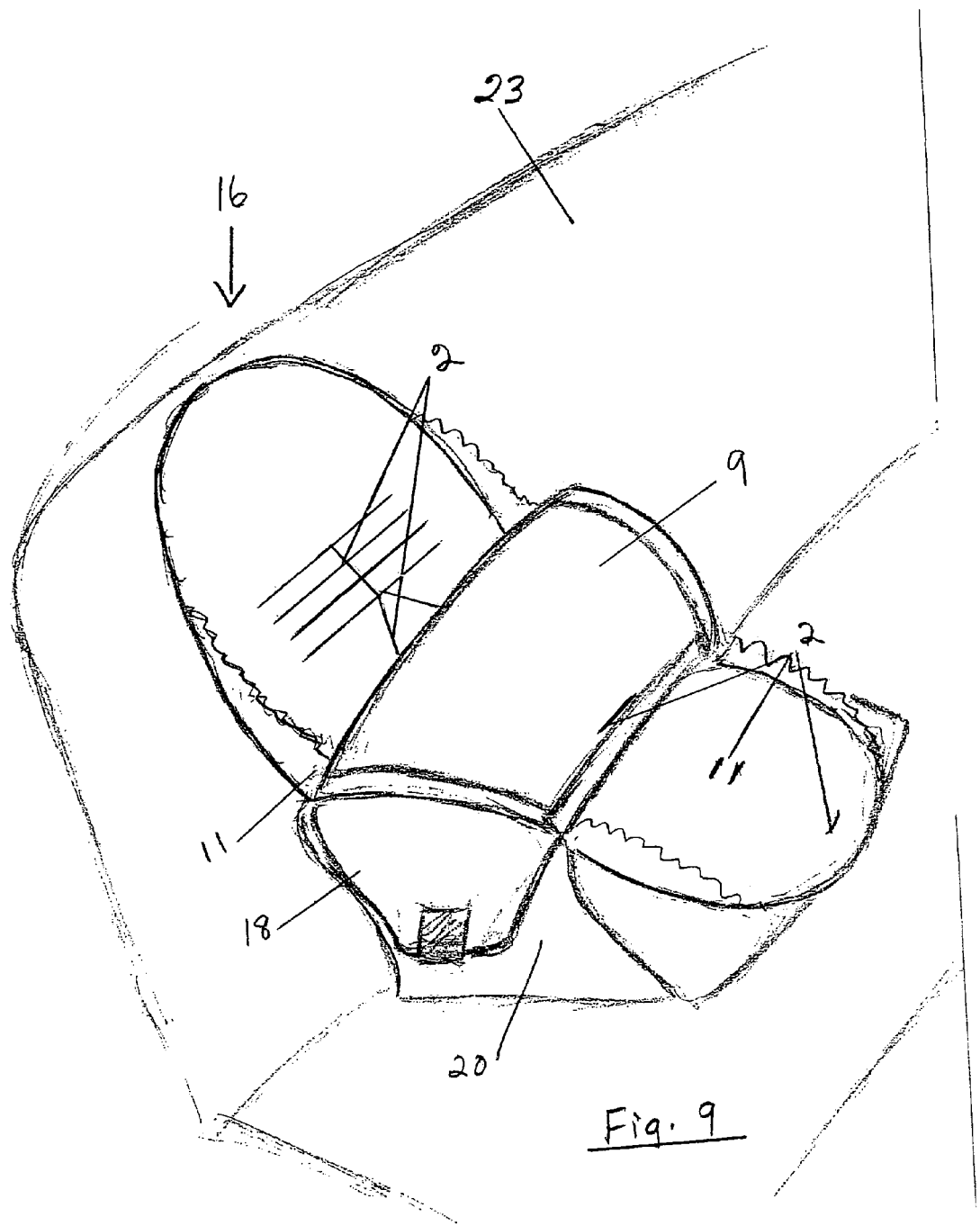
FIG. 9 is an angled side elevational view of versions B and C according to FIGS. 4 and 6 of the present invention, installed in a backless booster car seat with a protective arm

Referring to FIG. 9, Version C 16 is shown installed in a backless booster car seat 20. FIG. 9 also shows the protective arm 18 with Version B 15 installed. This Version C of the invention is versatile enough to fit any car seat and accommodate harness belts and vehicle seat belts, and can be used on a vehicle seat 23 without any car seat due to the option of adhesive backing and adhesive tabs on the backside. This version can be used in virtually any type of seat or situation where absorption and removeability are important factors.

Figure 10:
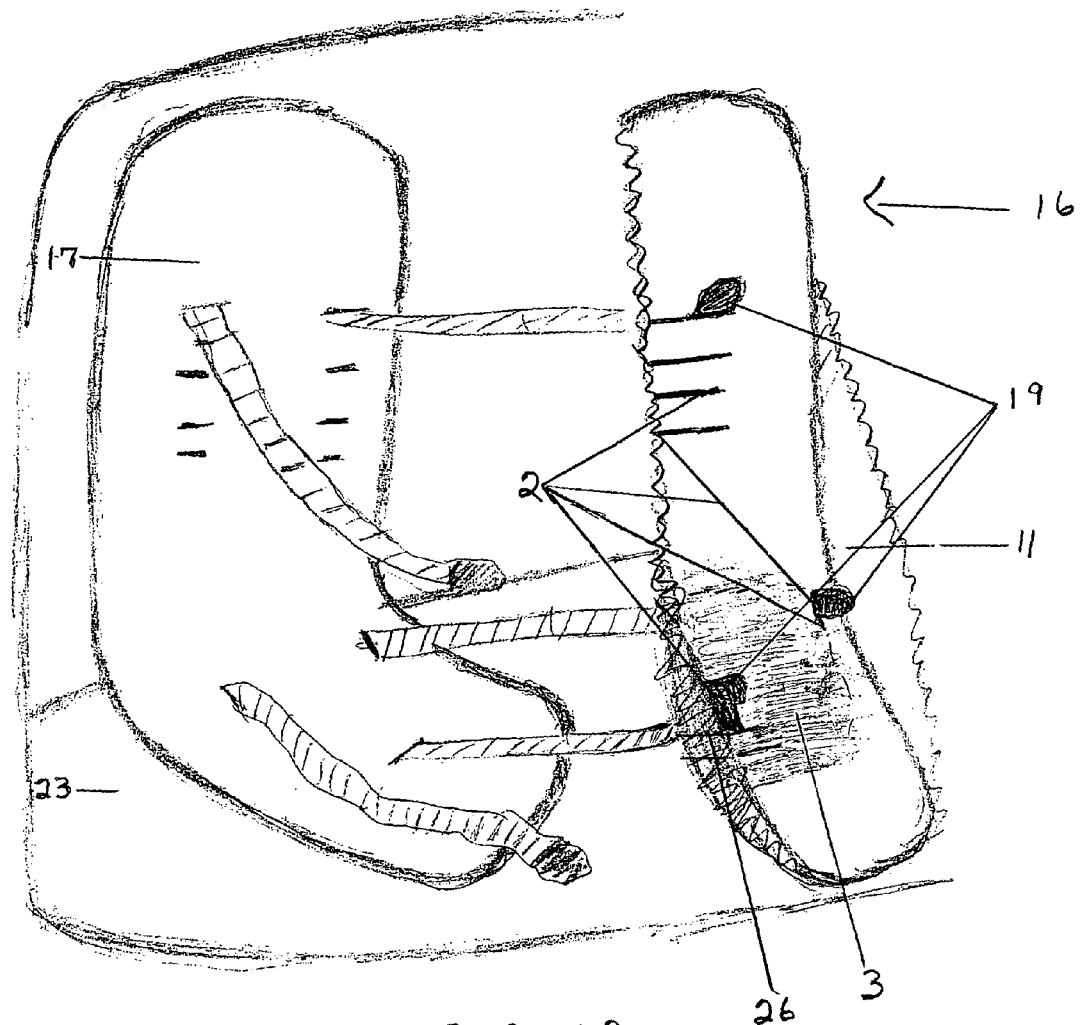
FIG. 10 is a cross-sectional side elevational view of version C according to FIG. 6 of the present invention, also representing version A according to FIG. 1 of the present invention, showing the harness belt hook-up of a vehicle's built-in car seat or the harness belt hook-up of a child car seat pushing through the line points of the car seat liners

Referring to FIG. 10, a cross-sectional side view of Version C shows the ease of the harness belts 19 on a built-in vehicle seat 17 pushing through the liner at the appropriate line points 2. FIG. 10 also shows the optional absorbent inner filler 26 in the seat area 3 of the liner, and the optional elasticized edge forming a well or barrier 11.

Figure 11:
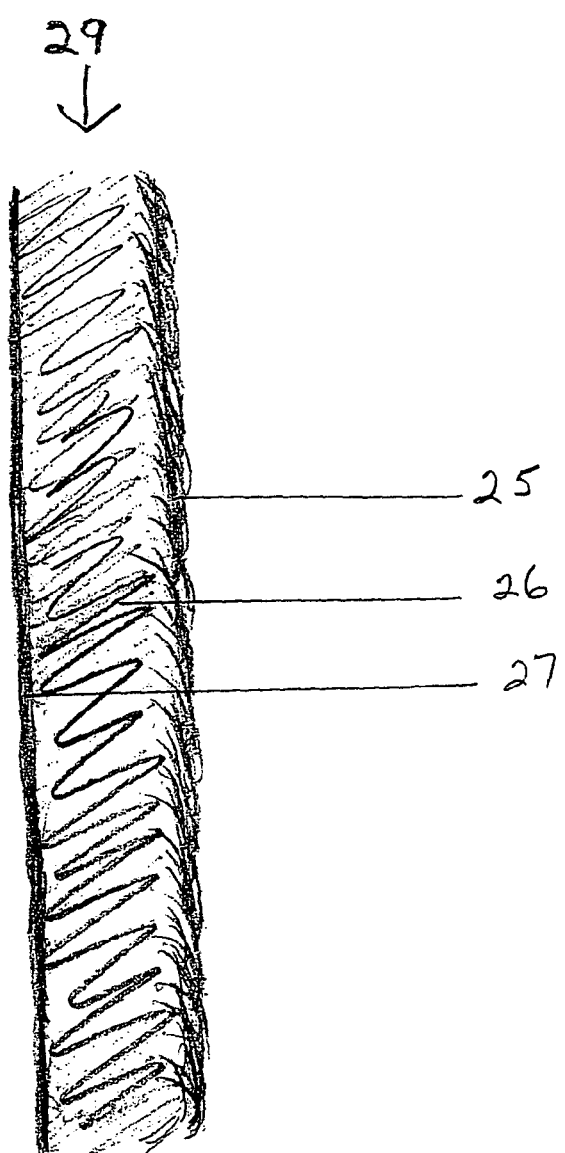
FIG. 11 is a cross sectional view of the sheet-like material with an absorbent first surface, an optional second layer of absorbent filler and a bottom non-permeable surface

Referring to FIG. 11, the disposable material 29 is shown with the first surface of absorbable material 25; the inner absorbable filler 26; and the bottom non-permeable surface. Page 5

Figure 12:
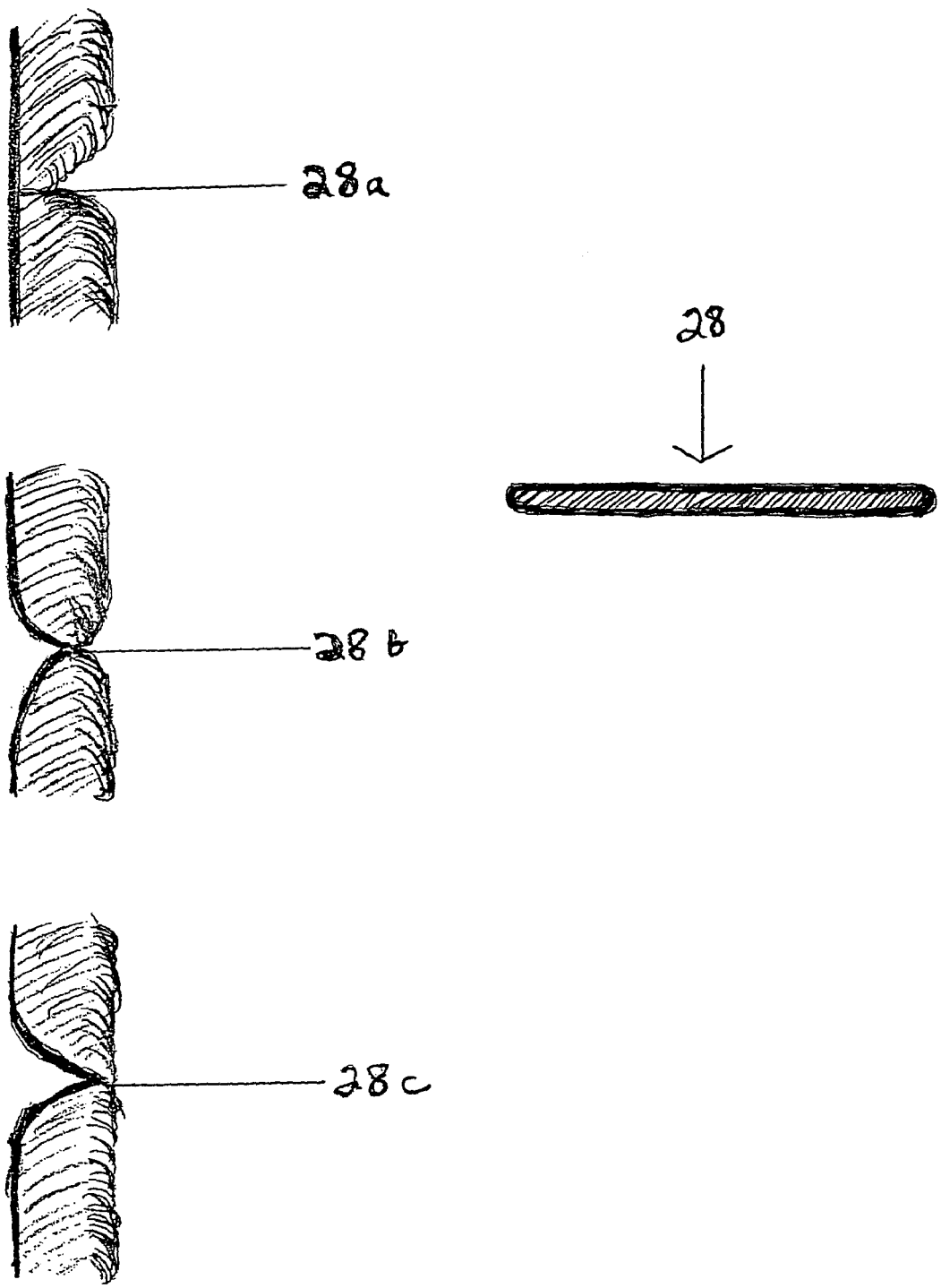
FIG. 12 is an enlarged detail of line points and possible methods of lining.

Referring to FIG. 12, an enlarged detail 28 of the line points 2 is shown, with possible methods of lining being: point lined from front layer to back layer 28a; point being lined from front and back layers; point being lined from back to front layer. The lining reduces the thickness and strength of the material, allowing the belts to rupture through the material or the material to be cut with ease.

Figure 13:
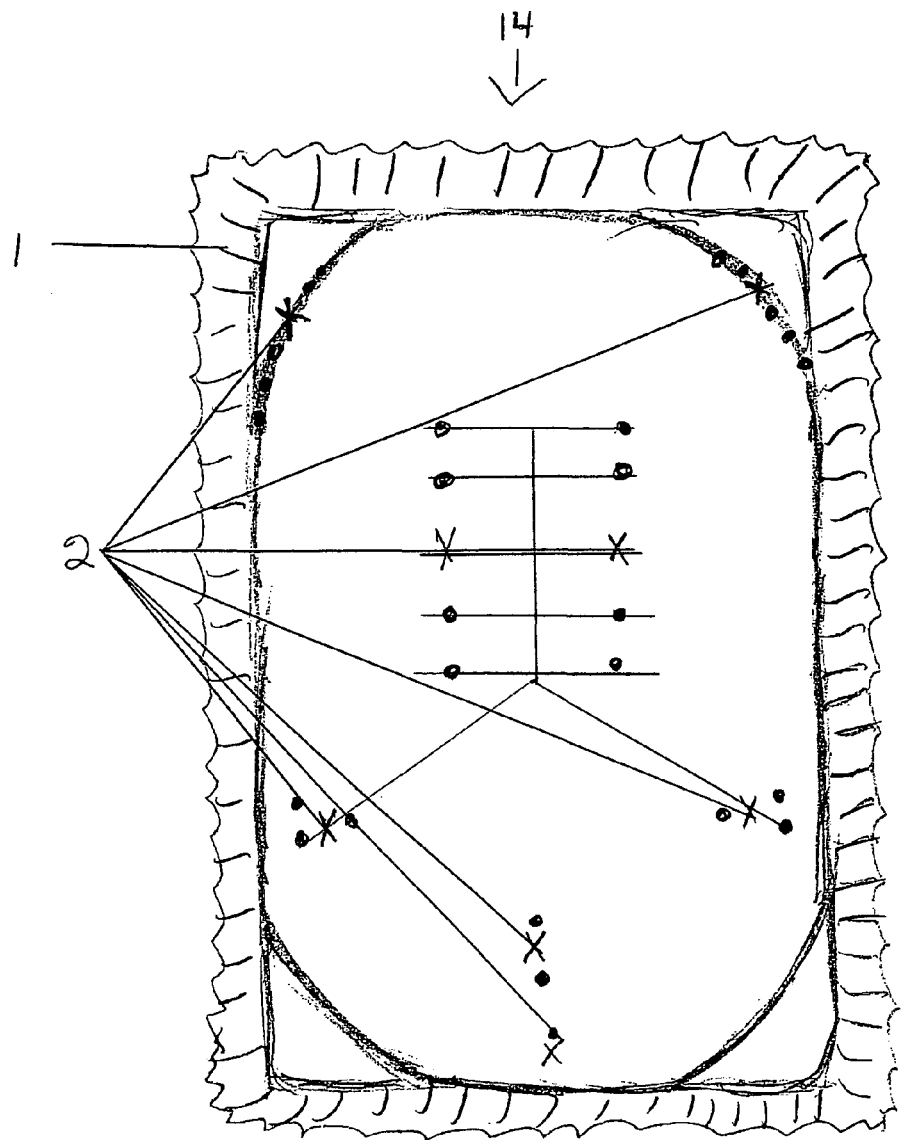
FIG. 13 is a front elevational view of sheet of material with line points and elasticized outer edge

Referring to FIG. 13, a sheet of disposable material as described in FIG. 12 is shown with line points 2 and an optional elasticized outer edge1. The many attributes of this material; soft, absorbent, disposable, and availability in the market place today, make it a very desirable option for this invention.

Figure 14:
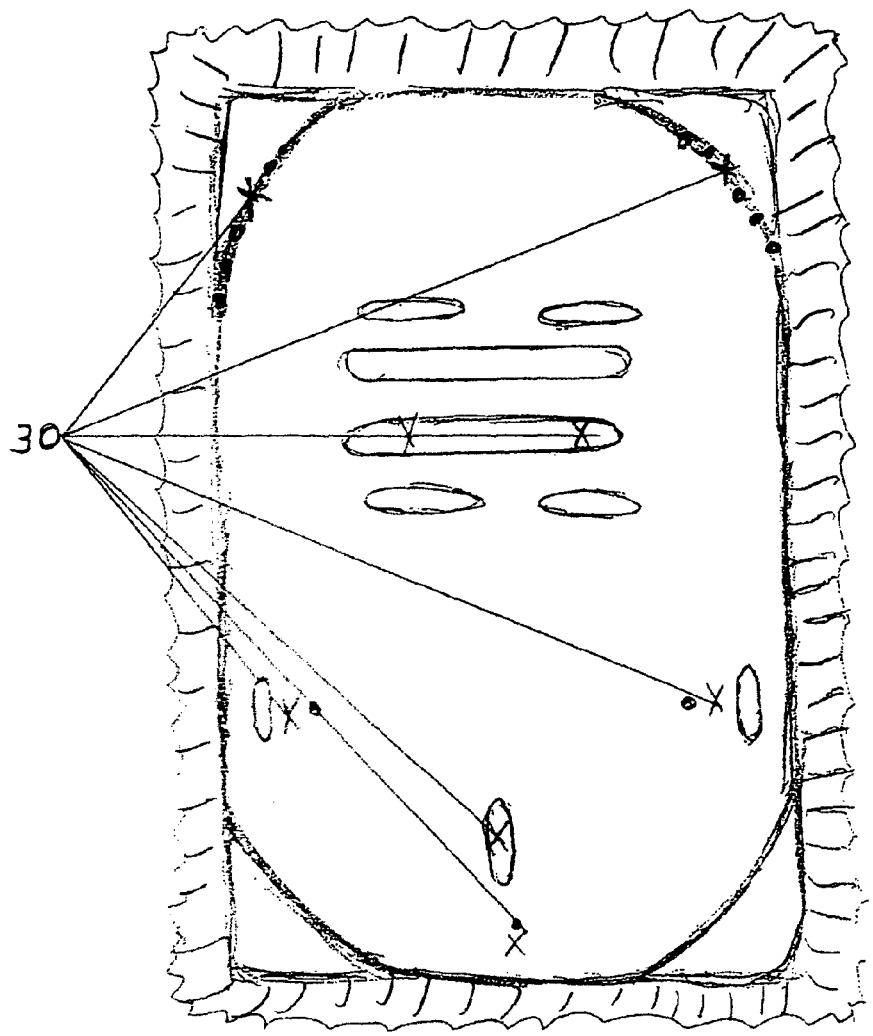
FIG. 14 is a front view of a version with pre-cut holes.

Referring to FIG. 14; a sheet of disposable material with pre-cut holes to accommodate a particular manufacturer's design of harness belts.

BENEFITS

Benefits of this invention include a clean, comfortable, sanitary environment for children and others in car seats and vehicle seats. This invention allows for adjustable fit for virtually all car seats available today, as well as many other seats, due to the several line points that accept the harness belt hook-ups; the elasticized edges; the security straps that are adjustable.

Time lost in traveling can be minimized if car seat messes can be quickly dealt with. Replacing the liner only takes a fraction of the time it takes to remove a car seat, vacuum vehicle and car seat, as well as wash and dry a car seat cover and vehicle upholstery. Any or all of these alternatives take considerable time whether traveling long distance or close to home.

Vehicles and car seats are both expensive investments. The added protection afforded by use of this invention would prove valuable in protecting these investments.

Purchasing a car seat with thick, comfortable padding in the original cover is now possible without the worry of keeping it clean; without the worry of waiting for an opportunity to wash the cover and wait for it to dry; when the child will not need the car seat to travel, if only to the local store. Of course, the thick padding on the cover provides a much more comfortable ride for the child.

If a child is comfortable and clean he will likely be content for longer periods of time while confined in the car seat. A happy child can make travel for everyone in the vehicle much more pleasant.

Although this invention has been described above with reference to particular means, materials and embodiments, it is to be understood that the invention is not limited to these disclosed particulars, but extends instead to all equivalents within the scope of the following claims.

BRIEF LIST OF REFERENCE NUMBERS USED IN THE DRAWINGS

1 Elasticized outer edge
2 Line points
3 Absorbent seat area
4 Security strap
5 Closure tab
6 Attachment of security strap to outer edge
7 Line point on version 13, protective arm liner
8 Expanded elasticized edge showing fit around outer edge of car seat
9 Protective arm liner, version B, installed
10 Elasticized edge of version A showing contouring capabilities
11 Elasticized edge of version C forming a well or barrier
12 Two sided closure tab with receiving tab surface
13 Light adhesive backing on version C
14 Version A liner
15 Version B liner
16 Version C liner
17 Existing vehicle car seat
18 Car seat and booster seat protective arm
19 Harness belt hook up and protective arm belt hook up
20 Backless booster car seat with protective arm
21 Light adhesive backing
22 Car seat with protective arm
23 Vehicle seat
24 Vehicle shoulder belt
25 Outer front absorbent surface of material
26 Middle layer of absorbent material
27 Back side non-permeable surface of material
28 Detail of line point
28a Line point being lined from front layer to back layer
28b Line point being lined from front and back layers
28c Line point being lined from back layer to front layer
29 Cross sectional view of material showing possible layers
30 Pre-cut holes in material as a manufacturer's option

I claim:

1. A liner for a child car seat, said car seat having a seat belt or straps, said liner comprising a sheet-like material, said material consisting of A first absorbent layer top surface, and A second nonpermeable layer bottom surface; and
a plurality of line points of
reduced thickness and reduced strength
on said sheet-like material, said line
points being adapted to be ruptured or cut easily by consumer and
receive the seat belts or straps of the car seat.

2. A liner according to claim 1 where said liner is shaped to fit into and conform with a child car seat.

3. A liner according to claim 2 wherein line points are positioned on the liner so that they correspond with and cooperate with the belt or straps of a child car seat.

4. A liner according to claim 1 where said liner is shaped to fit over and into a child booster seat, vehicle seat or other seat.

5. A liner according to claim 4 where said line points are positioned on the liner so that they correspond with and cooperate with the belt or straps of a child car booster seat, vehicle seat or other seat.

6. A liner according to claim 1 where said liner is shaped to fit around and conform with a protective arm bar of a child car seat.

7. A liner according to claim 6 wherein said line points are positioned on the liner so that they correspond with and cooperate with the belt or strap of a protective arm of a child car seat.

8. A liner according to claim 1 wherein the liner further comprises an elastic edging around the entire outer edge of the liner.

9. A liner according to claim 4 wherein the liner further comprises an elastic edging in the side central region of the right and left sides of the liner; said elastic edging being pulled taut, causing the sides of the liner to stand up, forming a well or barrier.

10. A liner according to claim 1 with a bottom surface, and with adhesive on all of the back side of the bottom surface.

11. A liner according to claim 1 wherein the liner further comprises being made of disposable materials.

* * * * *